United States Patent
Liu et al.

(10) Patent No.: US 10,565,470 B2
(45) Date of Patent: Feb. 18, 2020

(54) SYSTEM, METHOD AND RECORDING MEDIUM FOR USER INTERFACE (UI)-LEVEL CLONE DETECTION

(71) Applicant: International Business Machines Corporation, Armonk, NY (US)

(72) Inventors: Peng Liu, Yorktown Heights, NY (US); Marco Pistoia, Yorktown Heights, NY (US); Omer Tripp, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 15/843,208

(22) Filed: Dec. 15, 2017

(65) Prior Publication Data

US 2019/0188529 A1   Jun. 20, 2019

(51) Int. Cl.
| | |
|---|---|
| *G06K 9/62* | (2006.01) |
| *G06K 9/66* | (2006.01) |
| *G06K 9/34* | (2006.01) |
| *G06K 9/46* | (2006.01) |
| *G06N 20/00* | (2019.01) |
| *G06F 16/583* | (2019.01) |

(52) U.S. Cl.
CPC ....... *G06K 9/6215* (2013.01); *G06F 16/5838* (2019.01); *G06K 9/6202* (2013.01); *G06K 9/66* (2013.01); *G06K 9/344* (2013.01); *G06K 9/4604* (2013.01); *G06N 20/00* (2019.01)

(58) Field of Classification Search
CPC ........ G06K 9/6202; G06K 9/66; G06K 9/344; G06N 20/00
See application file for complete search history.

(56) References Cited

U.S. PATENT DOCUMENTS

| | | |
|---|---|---|
| 7,877,735 B2 | 1/2011 | Todorova et al. |
| 8,516,464 B2 | 8/2013 | Harrop et al. |
| 9,071,627 B2 | 6/2015 | Buck |
| 9,110,769 B2 | 8/2015 | Zhang et al. |
| 2012/0159434 A1 | 6/2012 | Dang et al. |

(Continued)

FOREIGN PATENT DOCUMENTS

GB     2 280 288 A     1/1995

OTHER PUBLICATIONS

Mel, et al. "The NIST Definition of Cloud Computing". Recommendations of the National Institute of Standards and Technology. Nov. 16, 2015.

(Continued)

*Primary Examiner* — Santiago Garcia
(74) *Attorney, Agent, or Firm* — Anthony Curro, Esq.; McGinn IP Law Group, PLLC (57) ABSTRACT

A user interface (UI)-level clone detection method, system, and computer program product, include running applications from an application database to obtain a screenshot of each of the applications, comparing a first object of a first screenshot of a first application with a second object from a second screenshot of a second application to determine a similarity between the first object and the second object, and analyzing a code for each of the first object and the second object when the similarity is greater than a predetermined threshold value to identify a same-functionality code.

17 Claims, 4 Drawing Sheets

(56) References Cited

U.S. PATENT DOCUMENTS

| | | | |
|---|---|---|---|
| 2012/0210431 A1* | 8/2012 | Stahlberg | H04W 12/1208 726/24 |
| 2012/0243745 A1* | 9/2012 | Amintafreshi | G06F 11/3688 382/103 |
| 2012/0297363 A1* | 11/2012 | Perisic | G06F 8/71 717/122 |
| 2014/0218385 A1* | 8/2014 | Carmi | G09G 5/377 345/590 |
| 2015/0235297 A1* | 8/2015 | Cheung | G06Q 30/0631 705/26.7 |
| 2016/0054994 A1 | 2/2016 | Sakamoto | |
| 2017/0177309 A1* | 6/2017 | Bar-Or | G06F 8/34 |
| 2017/0193296 A1* | 7/2017 | Duong | G06K 9/4671 |
| 2017/0242663 A1 | 8/2017 | Abu Hassan et al. | |
| 2017/0308380 A1 | 10/2017 | Lee et al. | |
| 2018/0121747 A1* | 5/2018 | Kogan | G06K 9/46 |
| 2018/0174288 A1* | 6/2018 | Kogan | G06T 7/0002 |
| 2018/0174330 A1* | 6/2018 | Chen | G06F 11/3664 |
| 2018/0197103 A1* | 7/2018 | Petursson | G06F 11/27 |
| 2019/0042079 A1* | 2/2019 | Choi | G06N 20/00 |
| 2019/0050323 A1* | 2/2019 | Kogan | G06F 11/3664 |

OTHER PUBLICATIONS

Stefan Wagner, et al. "Analysing Text in Software Projects", Software Engineering Group, Institute of Software Technology, University of Stuttgart, Univeritatsstr. 38,70569 Stuttgart, Germany, 2015.

Wei Wang, et al. "Recommending Clones for Refactoring Using Design, Context, and History" School of Computer Science, University of Waterloo. Waterloo, ON Canada [W65wang.migod]@uwaterloo.ca.

* cited by examiner

SYSTEM, METHOD AND RECORDING MEDIUM FOR USER INTERFACE (UI)-LEVEL CLONE DETECTION

TECHNICAL FIELD

The present invention relates generally to a UI-level clone detection method, and more particularly, but not by way of limitation, to a system, method, and recording medium for identifying common functionality in software applications based on the program UI.

BACKGROUND

Large organizations often develop multiple software applications (apps) that overlap, in parallel. The same is true of different small organizations and open-source contributors. Overlap is a source of multiple problems such as redundancy resulting in wasted work, inconsistency causing unsatisfactory user experience especially if the apps are developed by the same company, and maintainability (e.g., fixing hugs, adding features, etc.).

For example, organizations are developing many different mobile apps at the same time and these are dominated by user interaction and experience (e.g., storyboards, UI widgets, etc.).

Conventionally, identical code or, in more sophisticated implementations, similar code (obtained for example by modifying code that was previously copied and pasted) is desired to be detected. However, conventional techniques have failed.

SUMMARY

In an exemplary embodiment, the present invention can provide a computer-implemented UI level clone detection method, the method including running applications from an application database to obtain a screenshot of each of the applications, comparing a first object of a first screenshot of a first application with a second object from a second screenshot of a second application to determine a similarity between the first object and the second object, and analyzing a code for each of the first object and the second object when the similarity is greater than a predetermined threshold value to identify a same-functionality code.

One or more other exemplary embodiments include a computer program product and a system.

Other details and embodiments of the invention will be described below, so that the present contribution to the art can be better appreciated. Nonetheless, the invention is not limited. In its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a UI-level clone detection method 100.

DETAILED DESCRIPTION

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
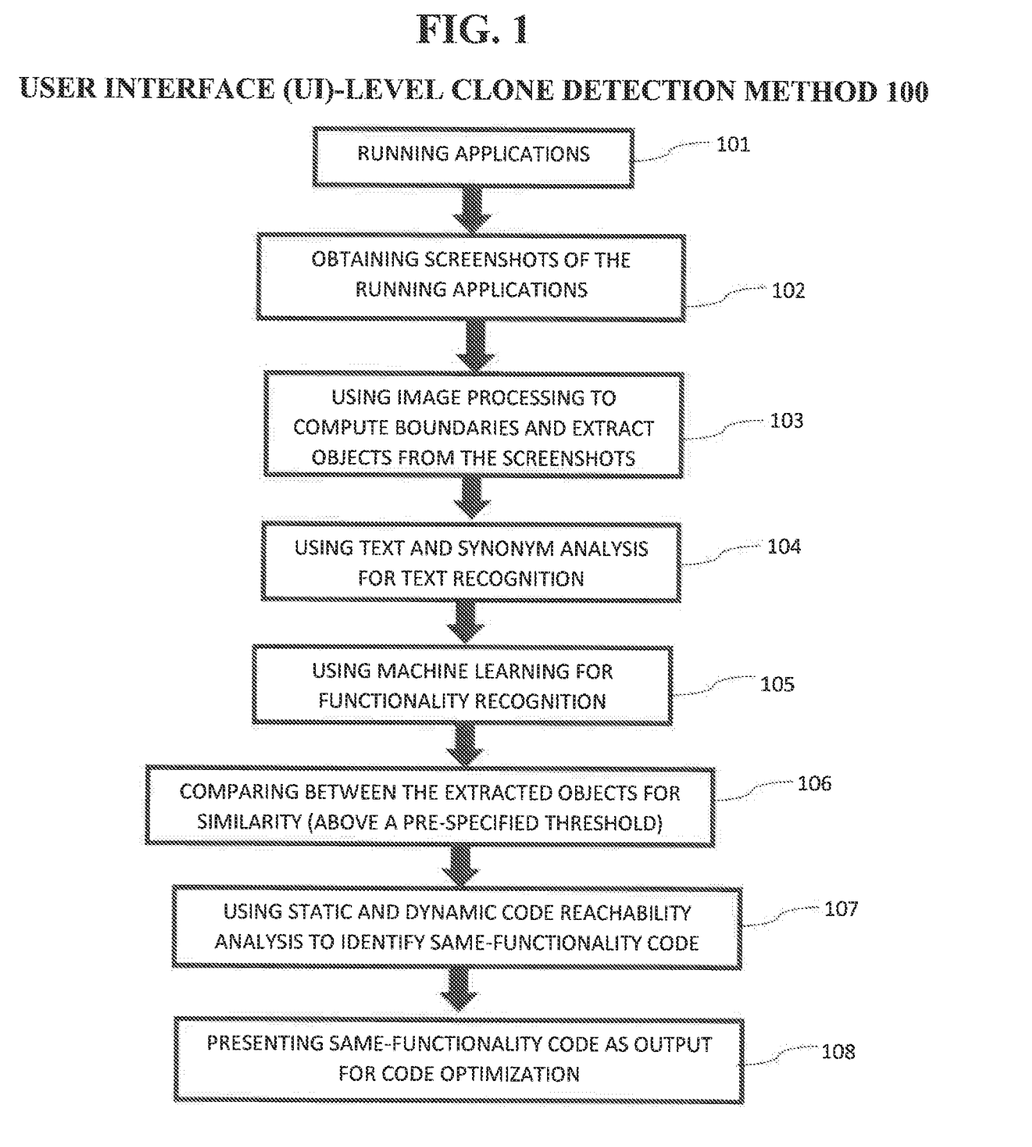

With reference now to the example depicted in FIG. 1, the User Interface (UI)-level clone detection method 100 includes various steps to identify common functionality in applications simply based on the program. UI without code-clone or code-similarity analysis and without sensitivity to underlying technologies. As shown in at least FIG. 2, one or more computers of a computer system 12 according to an embodiment of the present invention can include a memory 28 having instructions stored in a storage system to perform the steps of FIG. 1.

Although one or more embodiments (see e.g., FIGS. 2-4) may be implemented in a cloud environment 50 (see e.g., FIG. 3), it is nonetheless understood that the present invention can be implemented outside of the cloud environment.

With reference now to FIG. 1, the method 100 including steps 101-108 can identify common functionality in applications simply based on the program UI without code-clone or code-similarity analysis and without sensitivity to underlying technologies.

In steps 101-105, the applications for an organization are run, screenshots of the running applications are obtained, of which, image processing is used to compute boundaries and extract objects from the screenshots, textual recognition is used for text and synonym analysis of the screenshots, and machine learning is used for functionality recognition of the screenshots. In the first step, for each mobile application, we run monkey testing to collect the screenshots. In particular, monkey testing is a known technique that simulates users' interaction with the mobile applications by randomly interacting with the controls in the screens. In the next step, for each screen, we recognize the texts in it by applying existing optical character engines (e.g., tesseract) and extract visual objects in it by applying existing object detection work. In the third step, given the texts recognized and the objects extracted, we infer the functionality indicated by them. In particular, we first classify the visual objects (e.g., images) into a predefined set of categories (e.g., hospital, hotel and etc.) and then, with the categorical information and the texts recognized (e.g., check in), infer the functionality (e.g., check in a hotel). We explain the object classification and the functionality inference as follows. As for the object classification, it can be effectively done by training and applying the convolutional neural network model (CNN). In fact, there are already many well trained CNN models that can be used to recognize different classes of objects. As for the inference of the functionality, we build a sequence-to-sequence deep learning model that accepts the information extracted from the screen as input and produces a short description of the functionality as the output. The model is first trained on a small dataset prepared by experts and then the trained model is used for inference on a large dataset.

In step 106, a similarity between each of the applications is detected by running a comparison between the processed screenshots with a similarity being based on being above a pre-specified threshold. Given the short descriptions of the functionality associated with the screens, we can detect the similarity between the descriptions following two steps. In the first step, we apply Word2Vec technique to compute the semantic distance between every pair of words, which measures how semantically different the two words are. For instance, the distance between "cat" and "dog" should be smaller than that between "cat" and "hospital". In particular, the word2vec technique computes the vector to represent the semantics of every word and the Euclidean distance between two vectors to represent the semantic difference between the two corresponding words. The vectors are computed under the constraint that the words that are surrounded by the same words (in each sentence) should have similar semantics and therefore correspond to the vectors close to each other. A deep neural network model is built to predict (the vector representation of) each word from its surrounding words. The training of the model will minimize the prediction error, which further minimizes the distance between the words surrounded by the same words since their vectors should be as close to the predicted vector as possible. In the second step, given the distance between every pair of words, we calculate the distance between two descriptions (or simply speaking, two sentences) by applying the well studied minimal edit distance algorithm. Specifically, the algorithm allows three types of edit operations: (1) replacement, i.e., to replace each word in one sentence to the most semantically similar word in another sentence, (2) insert, i.e., to insert a new word, (3) delete, i.e., to delete an existing word. Each type of edit operation incurs certain cost: the cost of the replacement is the distance (computed in the first step) between the two words involved, and the cost of insert/delete is simply defined as 1. The minimal edit distance algorithm computes the sequence of edit operations that transform a sentence to another while incurring the minimal cost.

In step 107, using, for example, static and dynamic code reachability analysis, whether or not the same-functionality code is present in the different applications is identified. After two screens are identified as having the similar functionality we start out to find the code snippets associated with the screens and report them as clones. We first apply static analysis, which constructs a whole-program call graph between the methods and conducts a reachability analysis to determine which methods can be reached in the graph from the entry methods defined by the screens. However, the static analysis has some inherent limitations, which prevent it from being applied to the mobile applications that use the advanced programming features such as Java reflections. In this case, we rely on the dynamic analysis to find the reachable methods. In particular, we insert some additional code to the program at compile time, which at runtime execution time prints the methods being executed when a screen is being interacted with.

In step 108, the same-functionality code is presented as an output for code optimization (i.e., the applications are shown to have overlap).

Thus, with the method 100, a large class of code clones can be detected by processing images (screenshots) of the interface of the applications. That is, programs that exhibit identical or similar code, but also programs that exhibit the same functionality, even though implemented with completely different code can be detected since the screenshots are analyzed and not the code.

The method 100 can start the analysis directly from the UI level with an object recognition process to detect similar UI elements and a Natural Language Processing (NLP)-based text and synonym recognition to detect similar or the same functionality.

Once identical-functionality UIs are detected, a combination of static analysis (i.e., reachability analysis to detect all the code and libraries used) and dynamic analysis (i.e., run-time recording of each procedure invoked) is performed to retrieve the implementation code behind each UI. Therefore, the invention finds the links (e.g., the same functionality code) between two applications through statistical and dynamical analyses. Thus, the screenshots can pre-filter which applications have a higher chance of being duplicates to streamline the process of identifying duplicates with minimal processing required.

The results can be presented to the developers suggesting consolidation into one or more library codebases via program refactoring.

Thus, the inventive method starts directly from the UI level and looks for UI similarity, not coding of the program (i.e., coding may look different but actually be the same program). Further, object recognition is used to detect similarity at the UI level. There is no need for comparison between programs at the text level.

Thereby, because the screenshots are analyzed to identify possible overlaps, the method 100 can be portable and maintainable across environments, robust to technology differences, and leverages advances in computer vision and object recognition.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure comprising a network of interconnected nodes.

Figure 2:
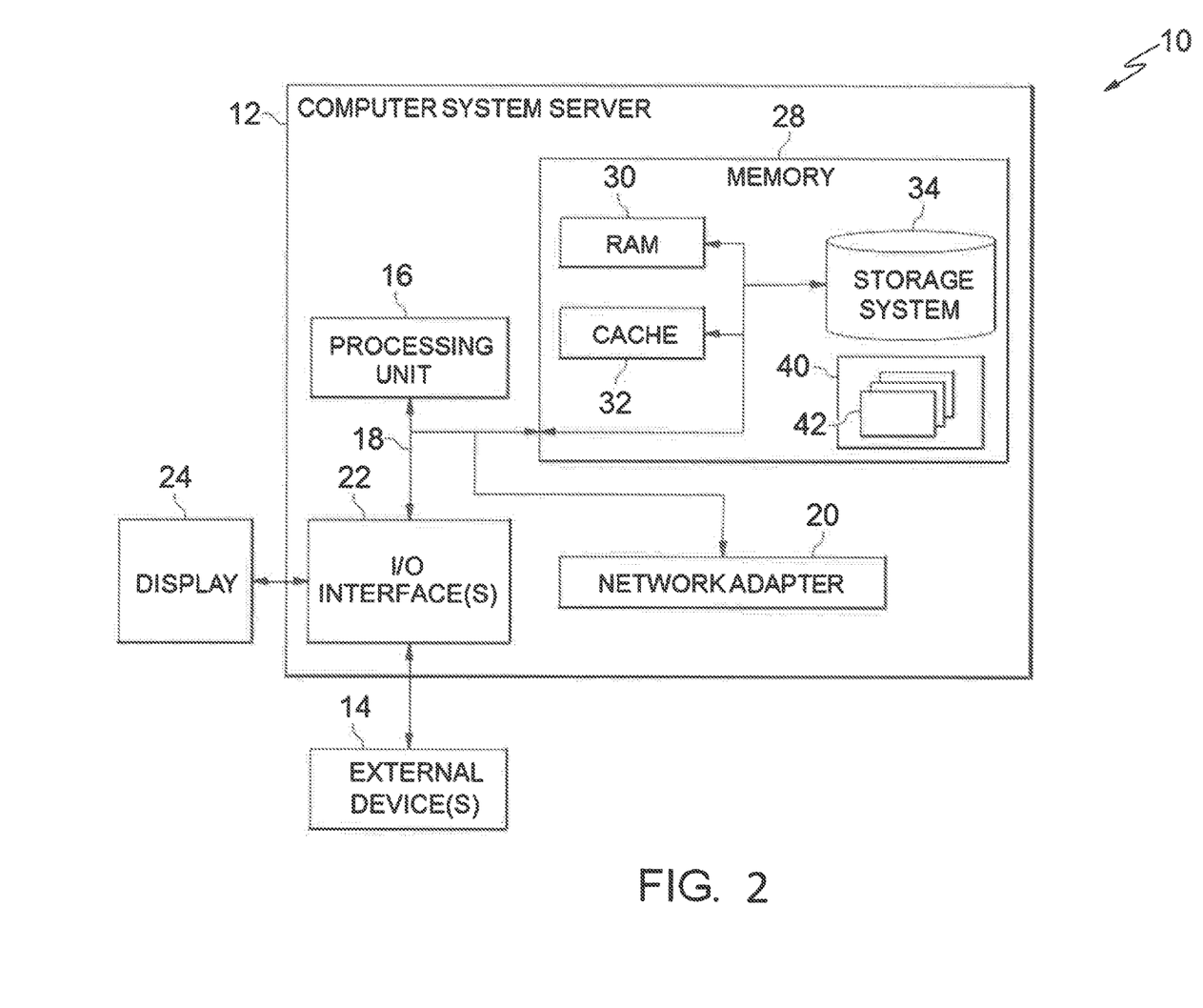
FIG. 2 depicts a cloud computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 anchor cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
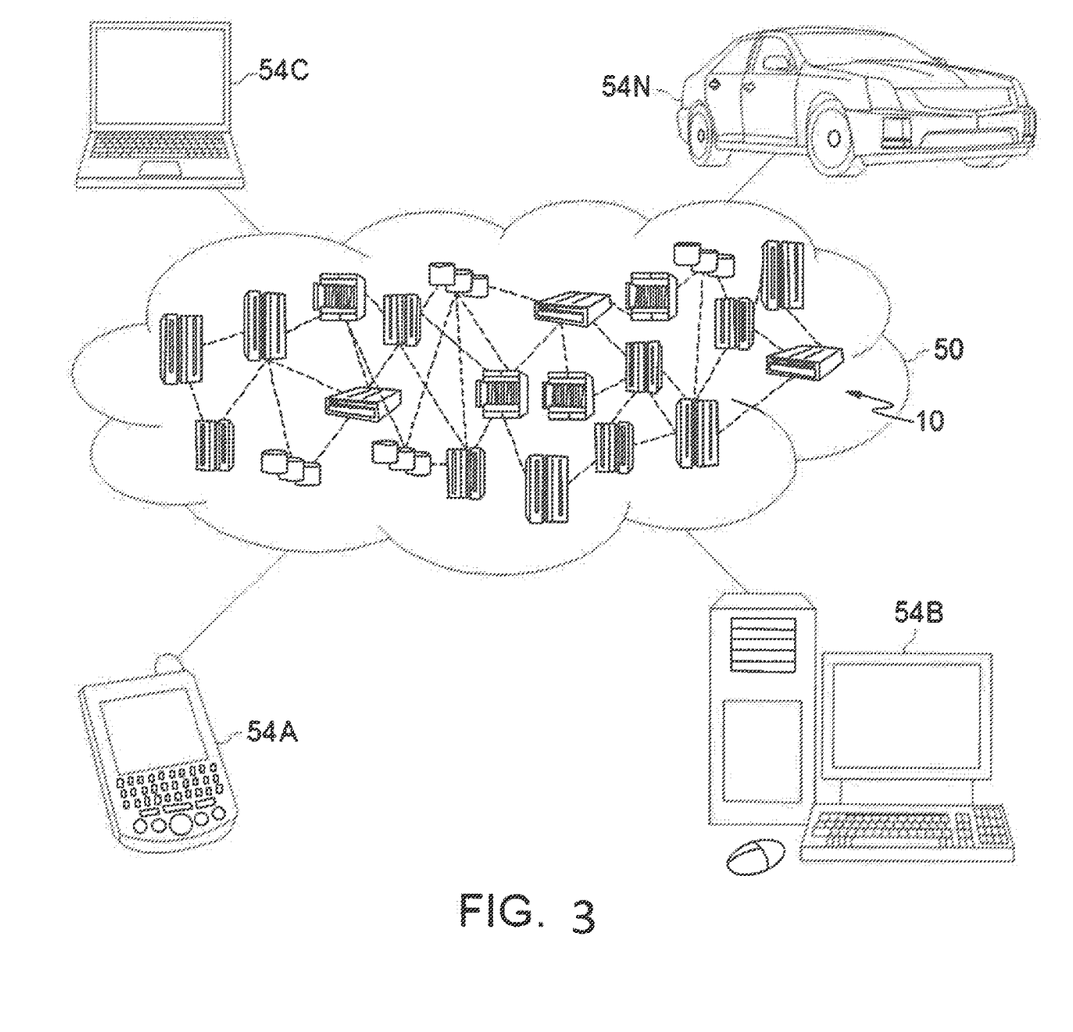
FIG. 3 depicts a cloud computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A N shown in FIG. 3 are intended to be illustrative only and that computing nodes 10 and cloud computing environment 50 can communicate with any type of computerized circuit over any type of network and/or network addressable connection (e.g., using a web browser).

Figure 4:
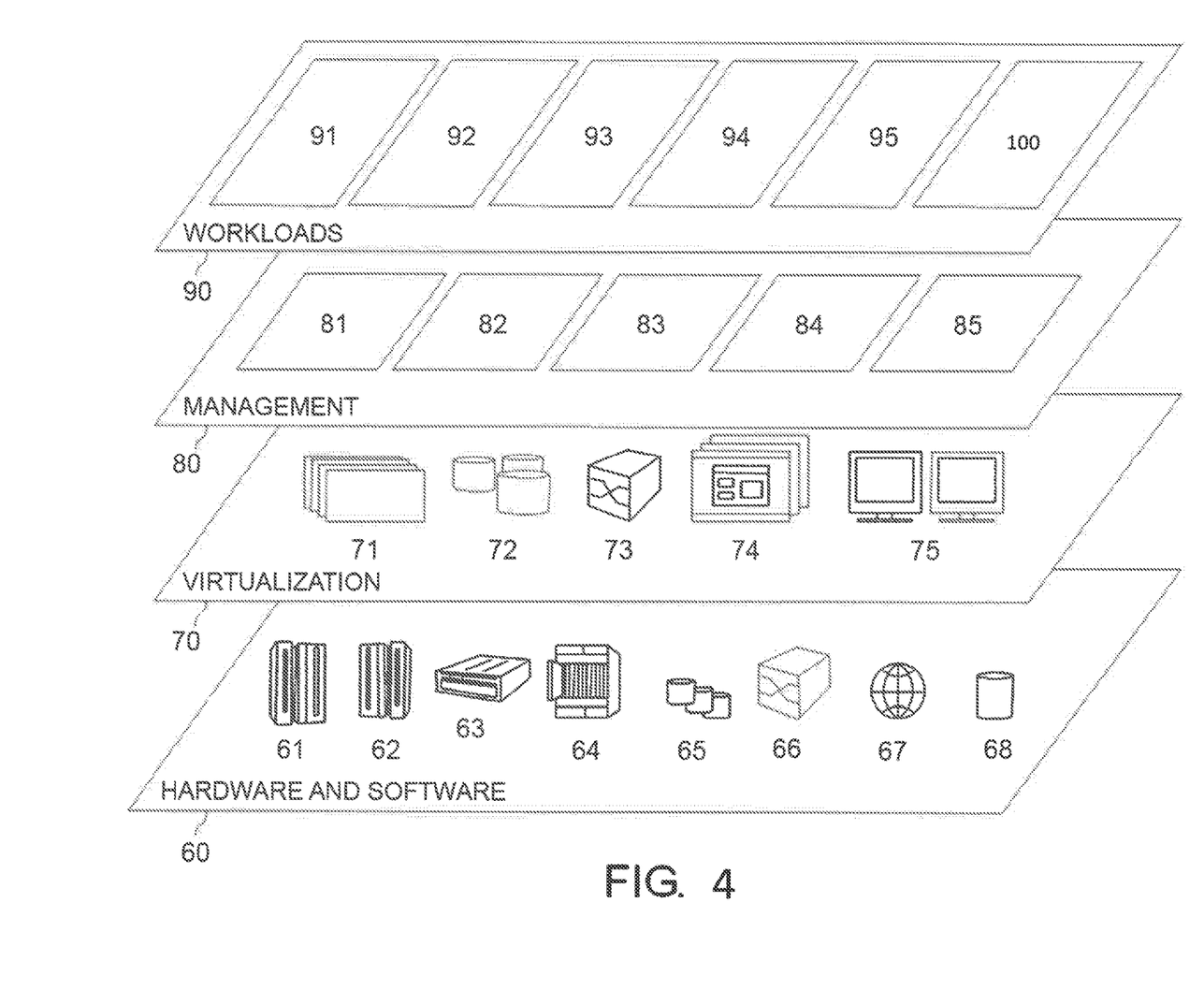
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met, Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the UI-level clone detectionmethod 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (FLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:
1. A computer-implemented user-interface (UI)-level clone detection method, the method comprising:
receiving one or more screenshots of one or more running applications from an application database;

comparing a first object of a first screenshot of a first application with a second object from a second screenshot of a second application to determine a same-functionality code similarity between the first object and the second object, the comparison being based on at least two different techniques for comparison; and analyzing the first object and the second object when the same-functionality code similarity is greater than a predetermined threshold value to identify a same-functionality code, wherein the analyzing analyses the first and the second object without a sensitivity to an underlying technology.

2. The computer-implemented method of claim 1, wherein the screenshot of each of the applications is processed to identify the first object and the second object using at least one of:

image processing to compute boundaries and extract the first object and the second object from the screenshots;
text recognition; and
machine learning for functionality recognition.

3. The computer-implemented method of claim 1, wherein the analyzing analyses the first object and the second object without a code-clone and a code-similarity analysis, wherein the analyzing uses a static analysis including a reachability analysis to detect the code and libraries used for the screenshot.

4. The computer-implemented method of claim 2, wherein the analyzing uses a static analysis including a reachability analysis to detect the code and libraries used for the screenshot.

5. The computer-implemented method of claim 1, wherein the analyzing uses a dynamic analysis including a run-time recording of each procedure invoked by the applications.

6. The computer-implemented method of claim 1, embodied in a cloud-computing environment.

7. A computer program product, the computer program product comprising a non-transitory computer-readable storage medium having program instructions embodied therewith, the program instructions executable by a computer to cause the computer to perform:

receiving one or more screenshots of one or more running applications from an application database;

comparing a first object of a first screenshot of a first application with a second object from a second screenshot of a second application to determine a same-functionality code similarity between the first object and the second object, the comparison being based on at least two different techniques for comparison; and analyzing the first object and the second object when the same-functionality code similarity is greater than a predetermined threshold value to identify a same-functionality code, wherein the analyzing-analyses the first and the second object without a sensitivity to an underlying technology.

8. The computer program product of claim 7, wherein the screenshot of each of the applications is processed to identify the first object and the second object using at least one of:

image processing to compute boundaries and extract the first object and the second object from the screenshots;
text recognition; and
machine learning for functionality recognition.

9. The computer program product of claim 7, wherein the analyzing analyses the first object and the second object without a code-clone and a code-similarity analysis, and wherein the analyzing uses a static analysis including a reachability analysis to detect the code and libraries used for the screenshot.

10. The computer program product of claim 8, wherein the analyzing uses a static analysis including a reachability analysis to detect the code and libraries used for the screenshot.

11. The computer program product of claim 7, wherein the analyzing uses a dynamic analysis including a run-time recording of each procedure invoked by the applications.

12. A User Interface (UI)-level clone detection system, said system comprising:

a processor; and a memory, the memory storing instructions to cause the processor to:

receiving one or more screenshots of one or more running applications from an application database;

comparing a first object of a first screenshot of a first application with a second object from a second screenshot of a second application to determine a same-functionality code similarity between the first object and the second object, the comparison being based on at least two different techniques for comparison; and analyzing the first object and the second object when the same-functionality code similarity is greater than a predetermined threshold value to identify a same-functionality code, wherein the analyzing analyses the first and the second object without a sensitivity to an underlying technology.

13. The system of claim 12, wherein the screenshot of each of the applications is processed to identify the first object and the second object using at least one of:

image processing to compute boundaries and extract the first object and the second object from the screenshots;
text recognition; and
machine learning for functionality recognition.

14. The system of claim 12, wherein the analyzing analyses the first object and the second object without a code-clone and a code-similarity analysis, and wherein the analyzing uses a static analysis including a reachability analysis to detect the code and libraries used for the screenshot.

15. The system of claim 13, wherein the analyzing uses a static analysis including a reachability analysis to detect the code and libraries used for the screenshot.

16. The system of claim 13, embodied in a cloud-computing environment.

17. The computer-implemented method of claim 1, wherein the analyzing analyses the first and the second object without a sensitivity to an underlying technology.

* * * * *